United States Patent
Viriat

(10) Patent No.: US 11,154,003 B2
(45) Date of Patent: Oct. 26, 2021

(54) PLACING UNIT HAVING A BRACING ASSEMBLY AND SEEDER COMPRISING SUCH UNITS

(71) Applicant: KUHN S.A., Saverne (FR)

(72) Inventor: Laurent Viriat, Westhouse-Marmoutier (FR)

(73) Assignee: KUHN S.A., Saverne (FR)

( * ) Notice: Subject to any disclaimer, the term of this patent is extended or adjusted under 35 U.S.C. 154(b) by 232 days.

(21) Appl. No.: 16/446,713

(22) Filed: Jun. 20, 2019

(65) Prior Publication Data

US 2019/0387662 A1  Dec. 26, 2019

(30) Foreign Application Priority Data

Jun. 22, 2018  (FR) ...................................... 18 55556

(51) Int. Cl.
*A01C 5/06*  (2006.01)
*A01C 7/20*  (2006.01)
(Continued)

(52) U.S. Cl.
CPC .............. *A01C 5/064* (2013.01); *A01C 5/068* (2013.01); *A01C 7/06* (2013.01); *A01C 7/082* (2013.01);
(Continued)

(58) Field of Classification Search
CPC ........... A01C 5/064; A01C 5/068; A01C 7/06; A01C 7/082; A01C 7/201; A01C 7/206; A01C 15/00
See application file for complete search history.

(56) References Cited

U.S. PATENT DOCUMENTS 4,603,746 A * 8/1986 Swales ................... A01B 15/16
   172/559
5,562,055 A * 10/1996 Petersen ................ A01B 35/32
   111/195
(Continued)

FOREIGN PATENT DOCUMENTS

EP  2 911 494 A1  9/2015
EP  3 158 844 A1  4/2017

OTHER PUBLICATIONS

French Preliminary Search Report dated Mar. 11, 2019 in French Application 18 55556 filed on Jun. 22, 2018 (with English Translation of categories of Cited Document & Written Opinion).

*Primary Examiner* — Thomas B Will
*Assistant Examiner* — Ian A Normile
(74) *Attorney, Agent, or Firm* — Oblon, McClelland, Maier & Neustadt, L.L.P.

(57) ABSTRACT

A placing unit for a seed drill includes at least two furrow-opening disks and at least two devices for delivery of particulate products from at least one reservoir, the respective ejection outlets of which are situated between the two opener disks in a manner mutually offset along the direction of advance. The placing unit also includes a body carrying the disks and devices. The placing unit includes an elongated assembly for firming of the product or products deposited at the bottom of the furrow, and an interface for linking with the body for the seed-firming assembly, which includes an end for fixation with the interface and an opposite bracing end. The linking interface includes at least two fixation sites for the corresponding end of the assembly, offset longitudinally relative to one another along the direction of advance.

18 Claims, 4 Drawing Sheets

(51) Int. Cl.
*A01C 7/08* (2006.01)
*A01C 7/06* (2006.01)
*A01C 15/00* (2006.01)

(52) U.S. Cl.
CPC .............. *A01C 7/201* (2013.01); *A01C 7/206* (2013.01); *A01C 15/00* (2013.01)

(56) References Cited

U.S. PATENT DOCUMENTS

| | | | |
|---|---|---|---|
| 5,598,795 A * | 2/1997 | House | A01C 5/06 111/170 |
| 2004/0255834 A1 * | 12/2004 | Schaffert | A01C 5/08 111/200 |
| 2005/0061219 A1 | 3/2005 | Sauder et al. | |
| 2005/0241554 A1 | 11/2005 | Sauder et al. | |
| 2011/0315246 A1 * | 12/2011 | Petersen | A01C 7/084 137/561 A |
| 2012/0266794 A1 | 10/2012 | Schaffert | |
| 2014/0209001 A1 | 7/2014 | Schaffert | |
| 2016/0262304 A1 | 9/2016 | Hagny et al. | |
| 2017/0295718 A1 * | 10/2017 | Peter | A01C 5/068 |
| 2018/0249624 A1 * | 9/2018 | Gentili | A01C 7/046 |
| 2020/0404836 A1 * | 12/2020 | Andres | A01C 5/066 |

\* cited by examiner

PLACING UNIT HAVING A BRACING ASSEMBLY AND SEEDER COMPRISING SUCH UNITS

BACKGROUND

The present invention relates to the field of agricultural machinery and more particularly to seed-sowing machines of the standard-seeder or seed-drill type, and it has as an object a placing or seed-sowing unit having a seed-firming assembly as well as a seeder provided with at least one such unit.

In known manner, a standard seeder or seed drill, which may be semi-mounted or tractor-drawn, is provided with several placing units mounted on a frame which also carries one or more reservoirs of products to be sowed/spread (seeds, fertilizers, etc.).

Each placing unit is traditionally provided with, on the one hand, two furrow-opening disks, arranged in V configuration pointing in the direction of advance during use and, on the other hand, a means for delivery of particular or granular products from a reservoir constituting part of the seeder, the ejection outlet of which means is situated between the two opener disks, and, finally, if necessary, an elongated assembly for firming the product deposited at the bottom of the furrow. The said placing unit also comprises a body carrying the said disks, means and assembly, and it is provided with at least one leg for rotary mounting of the opener disks and for assembling of an interface for linking of the flexible seed-firming assembly, which comprises an end for fixation with the interface and an opposite end braced on the bottom of the furrow.

The body of each placing unit is itself fixed to the frame of the seeder, and each delivery means consists in general of a conduit or tube, the outlet of which is situated a short distance above the bottom of the furrow excavated by the opener disks.

In known manner, each placing unit may also be provided with means (wheels, disks) for closing the furrow (offset to the rear relative to the opener disks) and if necessary feeler wheels or disks capable of adjusting and ensuring a constant seed placement depth.

The distribution of product(s) for these seeders is of the type that supplies one dose of seeds per unit area of field to be sowed.

The seed-firming assembly has the function of making the depth of deposition of seeds or the like uniform in the bottom of the furrow, in order to favor homogeneous sprouting of the plants. It is also aimed at ensuring good contact between the deposited products and the fine earth of the bottom of the furrow, in view of culminating in rapid germination, since the bottom of the furrow is normally more moist.

Different constructions of such seed-firming assemblies, generally in the form of a flexible blade, having complex mounting devices, are already known in connection with precision sowing, for which the seeds are distributed one-by-one on the sowing drill, at constant spacings, especially from the following documents:

US 2016/0262304 (traditional use of a seed-firming assembly in a precision seeder that delivers the seeds one-by-one on the sowing drill, with identical spacings; fixation by way of a leaf of spring-steel);

EP 2 911 494 (seed-firming assembly equipped with a stiffening insert);

US 2005/0241554 (seed-firming assembly supporting a tube for distribution of liquid);

EP 3 158 844 (seed-firming assembly mounted by way of a spring-loaded parallelogram).

In all of these known constructions, the seed-firming assembly has a single mounting position, designed such that the said assembly is positioned as close as possible to the associated ejection outlet.

In addition, the mounting interfaces of these known constructions are complex (numerous pieces) and they necessitate tools for mounting/demounting of the assembly.

Furthermore, seed drills exist that are capable, in versatile manner, of placing or distributing one or more products (for example: different types of seeds; seeds and simultaneously granulated fertilizers, etc.). These multiple-distribution seeders are equipped with at least two delivery means ending in at least two ejection outlets discharging between the opener disks of a placing unit (in other words, one front outlet and one rear outlet: viewed in direction of advance A).

Thus, during one and the same pass, one single type or two types of products may be placed selectively; in other words, for example: two types of seeds (one via the front outlet and another via the rear outlet), or one single type of seeds (optionally via the front or rear outlet).

In the current embodiments of these seed drills capable of placing two types of products, no seed-firming assembly is present. The use of a single assembly offset longitudinally beyond the rear outlet would not be satisfactory when only the front outlet is active, since firming of the seeds would take place too late. And positioning of two assemblies, each associated with one of the two orifices, is not constructively conceivable, since the seed-firming assembly associated with the front outlet would generate burial of products delivered via the rear outlet.

BRIEF SUMMARY

The objective of the present invention is to provide a simple seed-firming ability for a seed drill equipped with multiple-distribution placing units, especially with the ability of double placement per drill.

To this end, the invention has as an object a placing unit for a seed drill, wherein this unit comprises at least, on the one hand, two furrow-opening disks, arranged in V configuration pointing in the direction of advance during use of the seeder and, on the other hand, at least two means for delivery of particulate or granular products from at least one reservoir constituting part of the said seeder, the respective ejection outlets of which are situated between the two opener disks in a manner mutually offset along the direction of advance, wherein the said placing unit also comprises a body carrying the said disks and aforesaid means, wherein the unit is characterized in that it also comprises an elongated assembly for firming of the product or products deposited at the bottom of the furrow, and an interface for linking with the body for the said seed-firming assembly, which comprises an end for fixation with the interface and an opposite bracing end, and in that the linking interface comprises at least two fixation sites for the corresponding end of the assembly, offset longitudinally relative to one another along the direction of advance.

BRIEF DESCRIPTION OF THE DRAWINGS

The invention will be better understood by virtue of the description hereinafter, which relates to preferred embodiments, provided by way of non-limitative examples and explained with reference to the attached schematic drawings, wherein.

DETAILED DESCRIPTION

Figure 1:
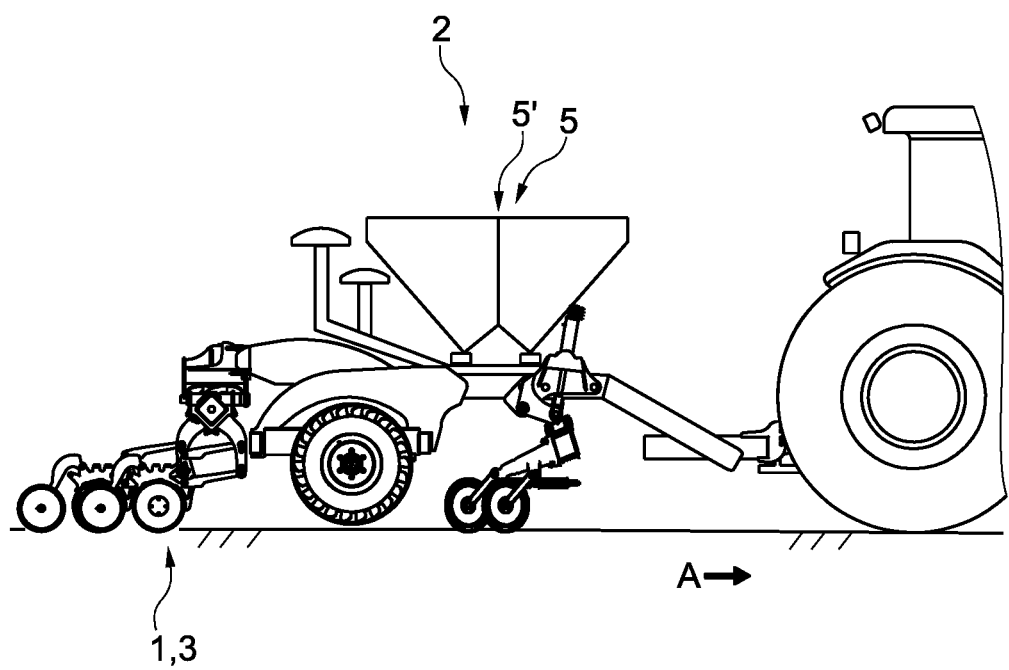
FIG. 1 is a schematic view in side elevation of a seed drill according to the invention, provided with a subdivided reservoir (the means for delivery of the products are not represented)

FIGS. 1 to 4 show (in some cases only partly) a placing unit 1 for a seed drill 2, wherein this unit comprises at least, on the one hand, two disks 3 for opening furrows 8, arranged in V configuration pointing in the direction of advance A during use of seeder 2 and, on the other hand, at least two means 4, 4' for delivery of particulate or granular products 2' from at least one reservoir 5 constituting part of the said seeder, the respective ejection outlets 6, 6' of which means are situated between the two opener disks 3 in a manner mutually offset along the direction of advance A, and, finally, a body 9 carrying the said disks 3 and aforesaid means 4, 4'.

Thus body 9 permits rotary mounting of opener disks 3 and the furnishing or fixation of a linking interface 11 for seed-firming assembly 7. Linking interface 11 extends below rear ejection outlet 6', as shown in particular in FIGS. 2A and 2B by way of example.

Thus body 9 permits rotary mounting of opener disks 3 and the furnishing or fixation of a linking interface 11 for seed-firming assembly 7. Linking interface 11 extends below rear ejection outlet 6', as shown in particular in FIG. 2 by way of example.

Of course, linking interface 11 may consist of one part of body 9 (which may have a double structure with a bearing block for each opener disk 3), but is preferably constituted by an attached piece, fixed on body 9.

Thus, by virtue of the invention, regardless of the sowing configuration, it is possible to position seed-firming assembly 7 in optimized manner, i.e. as close as possible to the outlet or to one of the outlets 6, 6' ejecting a product 2'. The two functions of the said assembly 7 (making the deposition depth uniform and ensuring good contact of the product or products 2' with the earth of bottom 8' of furrow 8) are consequently achieved as well as possible regardless of the seed-sowing configuration of seeder 2 (one product 2' being ejected at the front or at the rear/two products 2' being ejected at the front and at the rear).

Advantageously, and as shown in FIGS. 2A to 5, linking interface 11 is provided with two fixation sites 12 and 12', longitudinally offset relative to one another, wherein each site 12, 12' defines an indexed position along the direction of advance A of bracing end 7" of bracing assembly 7 relative to the respective ejection outlets 6, 6' of the two product delivery means 4 and 4'. Each of these latter may be connected to a separate reservoir or to a compartment of a subdivided reservoir 5 (see hopper of FIG. 1). According to one alternative, partition 5', which permits separation of reservoir 5 into two parts, is movable (even detachable) in a way that the distribution of the interior volume of the said reservoir 5 may be adapted to the type(s) of product(s) to be placed (one single type or two types of product).

As the aforesaid figures also illustrate for an exemplary embodiment having two outlets 6 and 6', second fixation site 12' is at least slightly offset longitudinally toward the rear, in the direction of advance A, relative to ejection outlet 6', which is situated furthest to the rear in the said direction of advance A of outlets 6, 6' of the two product delivery means 4 and 4', and the first fixation site 12 is at least slightly offset toward the rear relative to outlet 6, which is situated furthest toward the front along the direction of advance A.

In accordance with one embodiment of the invention, leading to a simple and inexpensive construction, fixation end 7' of seed-firming assembly 7 is assembled with linking interface 11 in the region of one of the fixation sites 12, 12' of this latter, by way of a snap-in linking connection, which preferentially is easily detachable.

Thus no specific piece is necessary for assembling, and mounting, and possibly demounting, may be achieved without any tool.

According to a preferred variant within the scope of the aforesaid embodiment, fixation end 7' of seed-firming assembly 7 is provided with assembling means 13 that are capable of and designed for cooperating with any one of fixation sites 12, 12' of linking interface 11, wherein the snap-in linking connection of detachable nature is achieved by elastic interlocking, especially by elastic deformation of one part at least of linking interface 11, in particular of at least one wall 14, 14' of the said interface 11 provided with fixation site 12, 12' in question or one part of this latter.

In conformity with a preferred embodiment of the invention, each fixation site 12 12' is constituted by a pair of aligned and coincident slots 12", made in opposite walls 14, 14' of linking interface 11.

As FIGS. 2A to 5 show by way of example of practical construction that is simple, economic and flexible in its use, linking interface 11 takes the form of a box provided with two opposite walls 14, 14' having cutouts 12" in the form of slots. These slots 12" are arranged two-by-two in facing coincident manner, and each pair of coincident slots 12" constitutes a fixation site 12, 12'. In addition, seed-firming assembly 7 is provided in the region of its fixation end 7' with protuberances 13 on two opposite lateral sides, wherein these protuberances 13 are capable of and designed for coming into snap-in engagement in slots 12" or a pair 12, 12' of coincident slots to form a rigid linking connection between the said fixation end 7' and the said box 11.

Preferably, the linking box 11 is constituted by a sheet-metal portion conformed to constitute a hollow body 11' of substantially polygonal cross section (rectangular cross section viewed in section along a horizontal plane) and having two opposite walls 14 and 14' provided with slots 12" that are mutually coincident in two-by-two manner, wherein these walls 14, 14' can be deformed elastically to cause their mutual spacing to be varied locally.

As FIGS. 2A to 4 show, ejection outlet 6' of second means 4' for delivery of product 2', advantageously in the form of tube and of conduit, discharges into or immediately above linking box 11, which forms a sleeve having a passage through it. Thus interface 11 constitutes a prolongation of tube or conduit 4', ensuring additional guidance of the product ejected via rear outlet 6'.

According to an advantageous characteristic of the invention, linking interface 11 is fixed to a leg 10 constituting part of body 9 and carrying opener disks 3, wherein the said interface 11 is positioned below and to the rear of axis of rotation AX of the said opener disks 3.

As shown by way of example in FIGS. 2A to 4, box 11 forming the linking interface may be fixed by two screws 15 on an appendage 10' of support leg 10. Front ejection outlet 6 extends in front of axis of rotation AX, while rear ejection outlet 6' extends behind axis of rotation AX. Leg 10 extends between ejection outlets 6 and 6'. In addition, it may be provided that box 11 is fixed on body 9 carrying opener disks 3 in the region of folded-over free rims 16, facing one another, of the conformed sheet-metal portion forming body 11' of box 11, wherein the said rims 16 are sandwiched between body 9 and the heads of fixation screws 15. According to another alternative, linking box 11 is obtained by assembling separate parts by welding. Alternatively, linking box 11 is a molded plastic piece, the walls of which are elastically deformable.

Thus, when interface 11 consists of a box formed by a folded metal sheet, the folded-over rims 16 may be joined under the heads of screws 15, and walls 14, 14' of elastically deformable sheet metal permit easy positioning and removal of seed-firming assembly 7 in the different fixation sites 12, 12' as well as secure holding of these latter in cooperation with a lateral guiding means for the said assembly 7 between the said walls 14, 14'.

Figure 2A:
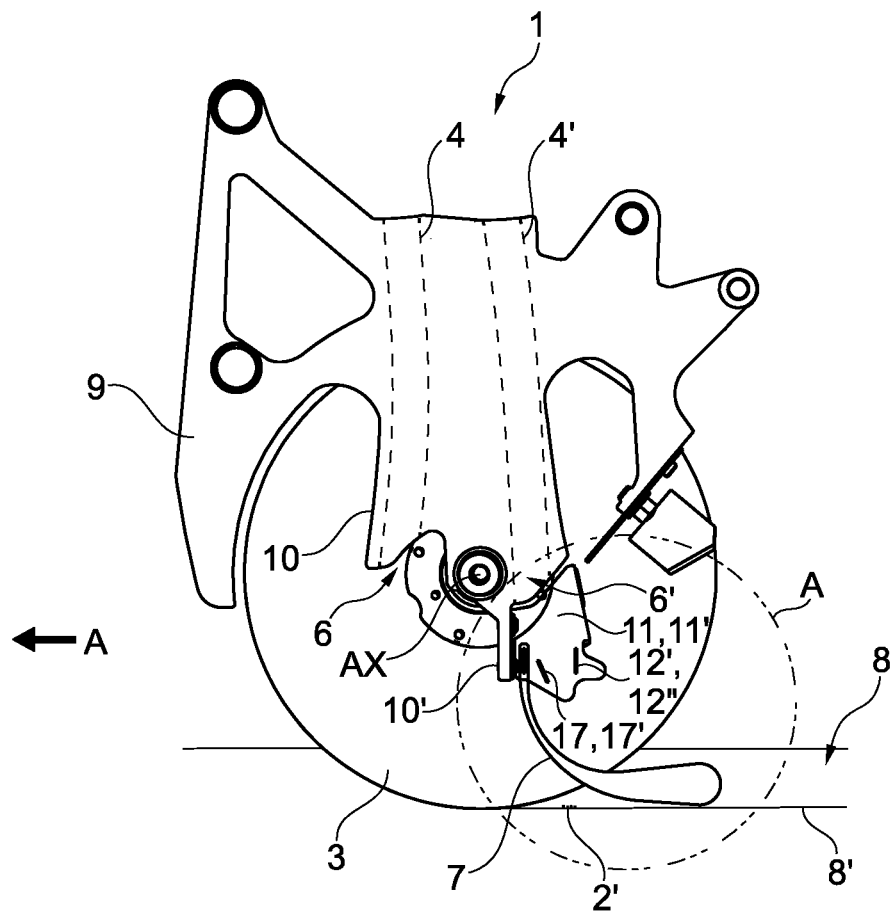
FIG. 2A is a simplified schematic view in side elevation of a placing unit according to the invention.
Figure 2B:
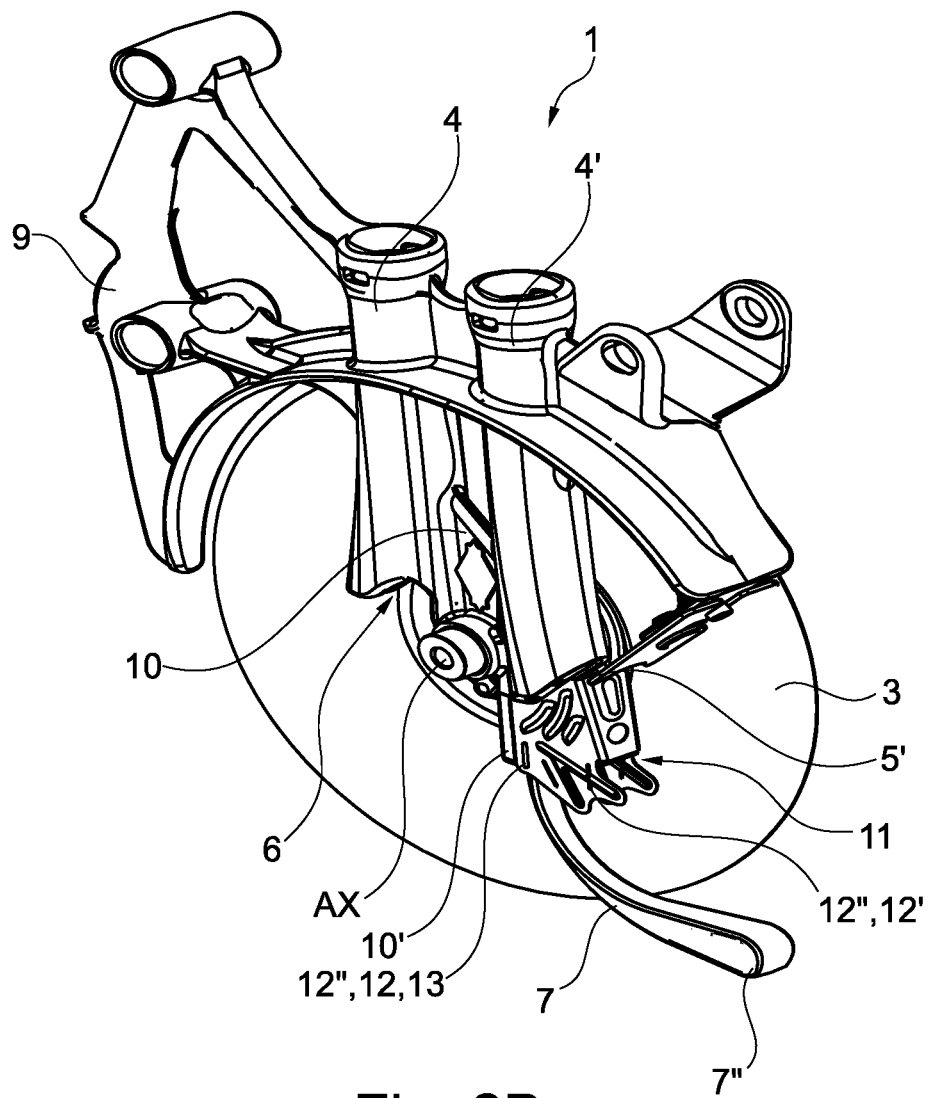
FIG. 2B is a rear view in perspective along the direction of advance of the unit represented in FIG. 2A, wherein one of the two opener disks has been removed.
Figure 5:
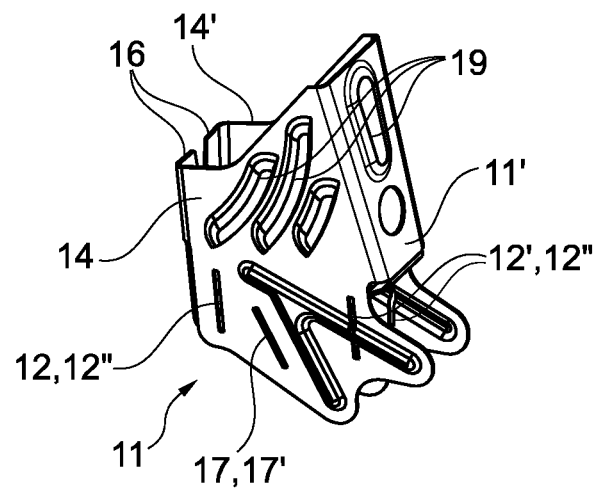
FIG. 5 is a view in perspective of the box forming the linking interface, constituting part of the unit represented in FIGS. 2A to 4.
Figure 6:
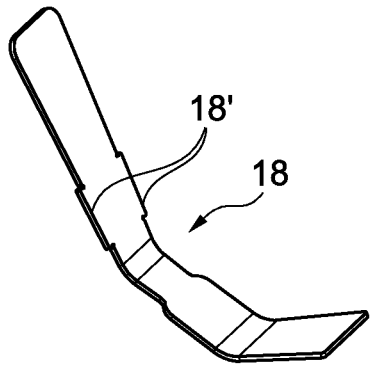
FIG. 6 is a view in perspective of a deflector element constituting part of the unit represented in FIG. 4, and, FIGS. 7 and 8 are views in perspective at different angles of a seed-firming assembly constituting part of the unit represented in FIGS. 2A to 4.

As shown by way of illustration in FIGS. 2A and 2B, body 9 may integrate, in a single structural unit (assembled by welding, for example), the interfaces for fixation of the said body to the frame of seeder 2, the leg 10 and the ends of the two conduits 4, 4' for delivery and distribution of products, ending at ejection outlets 6, 6'.

Seed-firming assembly 7 advantageously has the form of an elastically deformable blade of plastic material, with a fixation end 7' provided with means 13 for engagement in slots 12" of sites 12, 12', and a bracing end 7", which as the case may be becomes progressively thicker and if necessary is profiled.

Figure 7:
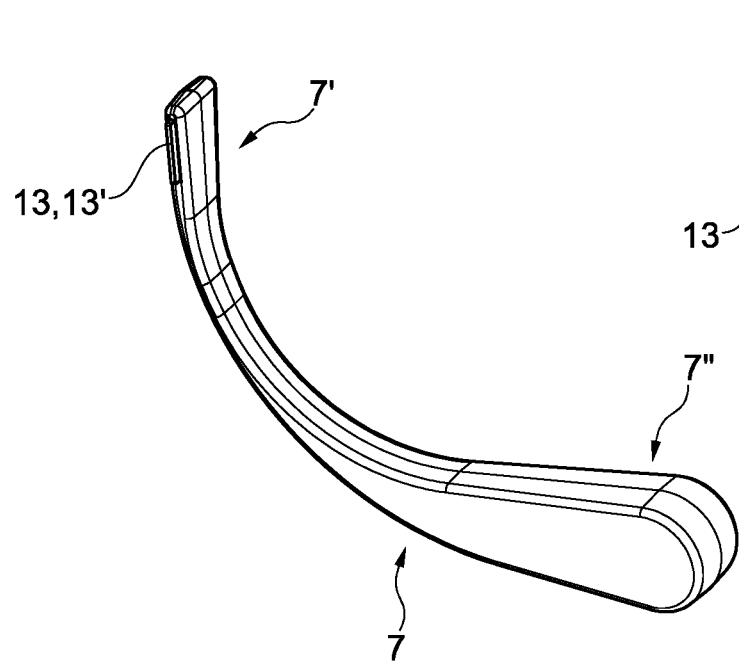
Figure 8:
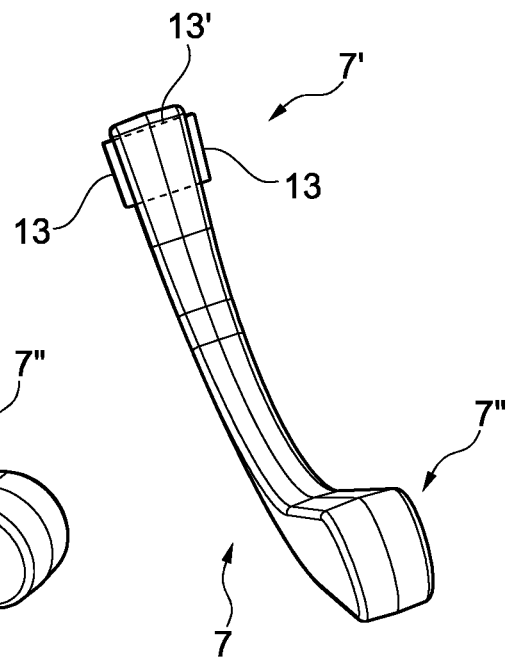

As illustrated in FIGS. 7 and 8, and according to a characteristic of the invention, seed-firming assembly 7 is provided with protuberances 13 projecting laterally in the region of its fixation end 7' and constituting means for assembling with linking interface 11, The protuberances 13 advantageously consist of projecting wing portions of a metallic blade 13', The projecting wing portions are not overmolded by the constitutive polymer material of the said assembly 7. The metallic blade 13' forms an insert integrated in the single fixation end 7' or the metallic blade 13' extends into a longitudinal part at least of the said assembly 7.

In order to be able to take into account varied working conditions, different natures of soils or adjustable desired bracing forces, it may be provided that at least some of the fixation sites 12, 12' of linking interface 11 are also offset relative to one another along a vertical direction, i.e. perpendicular to the direction of advance A.

Thus several "vertical" positions may potentially correspond to each "longitudinal" position for seed-firming assembly 7.

Additionally, it may be provided that linking interface 11 also has at least one site 17 for fixation of a deflector element 18, for example a site 17 formed by two coincident facing slots 17' for snap-in mounting of an elongated deflector element 18 in the form of a blade, designed to extend above seed-firming assembly 7 and provided with projecting lateral wing portions 18' designed to come into engagement in the said slots 17'.

To favor evacuation of air blown by outlet 6' discharging into interface box 11 (which air serves to transport products 2' into delivery means 4, 4'), the walls of box 11, which preferably define a sleeve that is open in upper and lower parts, is provided with openings 18 forming vents 19.

Finally, the invention also has as an object, as shown in FIG. 1, a tractor-drawn or semi-mounted seed drill 2. This seeder is characterized in that it is provided with at least one, preferably several placing units 1 such as described hereinabove, each equipped with a seed-firming assembly 7 capable of being positioned interchangeably in at least two positions offset longitudinally along the direction of advance A of seeder 2 during use and with at least two means 4, 4', which deliver the product or products 2' to be deposited into furrow 8, and the respective ejection outlets 6, 6' of which are offset along the direction of advance A, wherein these means 4, 4' may be made operational or active selectively or simultaneously.

Figure 3:
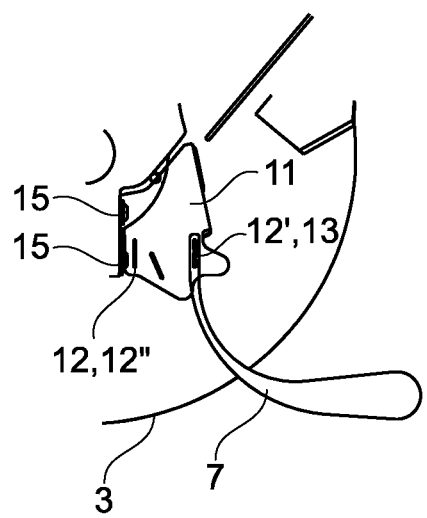
FIGS. 3 and 4 are partial views of detail A of FIG. 2A, illustrating two different configurations for mounting of the seed-firming assembly.
Figure 4:
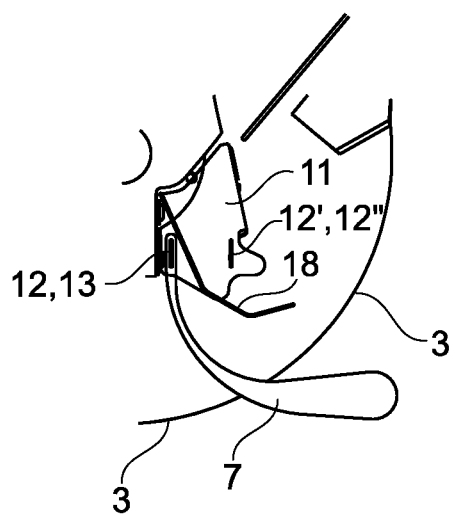

By virtue of the invention, and depending on the wishes of the grower, it is therefore possible:

to sow a type of seed via front outlet 6 and to firm the seed with seed-firming assembly 7 in front position (see FIG. 2A), while rear outlet 6' is not being used;

to sow a type of seed via front outlet 6 and to firm the seed with seed-firming assembly 7 in front position and to spread another product such as fertilizer or slug-control granules on the surface via the deflector (see FIG. 4);

to place fertilizer via front outlet 6, seeds via rear outlet 6' and to firm the seed with seed-firming assembly 7 in rear position (see FIG. 3).

Finally, it is easy to retract seed-firming assembly 7 when sticky soil conditions are encountered, to avoid clogging up the space between the two opener disks 3 (freeing up space).

Of course, the invention is not limited to the embodiments described and represented in the attached drawings. Modifications are still possible especially from the viewpoint of the constitution of the various elements or by substitution of equivalent techniques, without departing from the scope of protection of the invention.

The invention claimed is:

1. A placing unit for a seed drill, comprising:
   at least two furrow-opening disks arranged in V configuration pointing in the direction of advance during use of the seed drill;
   at least two means for delivery of particulate or granular products from at least one reservoir constituting part of the seed drill, respective ejection outlets of which means for delivery are situated between the two opener disks in a manner mutually offset along the direction of advance;
   a body carrying the disks and said means for delivery;
   an elongated seed-firming assembly for firming of the product or products deposited at the bottom of the furrow; and
   an interface for linking with the body for the seed-firming assembly, the seed-firming assembly comprises an end for fixation with the interface and an opposite bracing end,
   wherein the linking interface comprises at least two fixation sites for a corresponding end of the seed-firming assembly, offset longitudinally relative to one another along the direction of advance, and
   wherein the seed-firming assembly is provided with protuberances projecting laterally in the region of its fixation end, the protuberances constituting means for assembling with the linking interface, wherein the protuberances include projecting wing portions of a metallic blade, wherein the wing portions are not overmolded by constitutive polymer material of the assembly, wherein the metallic blade forms an insert integrated in the fixation end or extends into a longitudinal part at least of the body of the assembly.

2. The placing unit according to claim 1, wherein the linking interface is provided with two fixation sites, including a first fixation site and a second fixation site longitudinally offset relative to one another, wherein each site defines an indexed position along the direction of advance of the bracing end of the seed-firming assembly relative to the respective ejection outlets, including a first ejection outlet and a second ejection outlet, of the two product delivery means.

3. The placing unit according to claim 2, wherein the second fixation site is at least slightly offset longitudinally toward the rear of the second ejection outlet in the direction of advance, the second ejection outlet is situated furthest to the rear in the direction of advance of the ejection outlets of the two product delivery means, and the first fixation site is at least slightly offset toward the rear relative to the first ejection outlet, which is situated furthest toward the front along the direction of advance.

4. The placing unit according to claim 1, wherein the fixation end of the seed-firming assembly is assembled with the linking interface, in the region of one of the fixation sites of this latter, by way of a snap-in linking connection.

5. The placing unit according to claim 4, wherein the fixation end of the seed-firming assembly is provided with assembling means that are capable of and designed for cooperating with any one of the fixation sites of the linking interface, wherein the snap-in linking connection of detachable nature is achieved by elastic interlocking.

6. The placing unit according to claim 5, wherein the elastic interlocking includes elastic deformation of one part at least of the linking interface.

7. The placing unit according to claim 6, wherein the one part is at least one wall of the interface provided with the fixation site.

8. The placing unit according to claim 1, wherein each fixation site includes a pair of aligned and coincident slots, made in opposite walls of the linking interface.

9. The placing unit according to claim 1, wherein the ejection outlet of a second means of the at least two means for delivery of product discharges into or immediately above the linking interface, which forms a sleeve having a passage through the sleeve.

10. The placing unit according to claim 9, wherein the ejection outlet of the second means for delivery of product is a tube and a conduit.

11. The placing unit according to claim 1, wherein the linking interface is fixed to a leg constituting part of the body and carrying the opener disks, wherein the interface is positioned below and to the rear of an axis of rotation of the opener disks.

12. The placing unit according to claim 1, wherein at least some of the fixation sites of the linking interface are also offset relative to one another along a vertical direction, which is perpendicular to the direction of advance.

13. The placing unit according to claim 1, wherein the linking interface also has at least one site for fixation of a deflector element.

14. The placing unit according to claim 13, wherein the site for fixation of a deflector element is a site formed by two coincident facing slots for snap-in mounting of an elongated deflector element in the form of a blade, designed to extend above the seed-firming assembly and provided with projecting lateral wing portions designed to come into engagement in the slots.

15. A tractor-drawn or semi-mounted seed drill, comprising:
at least one of the placing unit according to claim 1, each placing unit being equipped with a seed-firming assembly capable of being positioned interchangeably in at least two positions offset longitudinally along the direction of advance of the seed drill during use and at least two means for delivery of the product or products to be deposited into the furrow, the respective ejection outlets of which means are offset along the direction of advance,
wherein these means may be made operational or active selectively or simultaneously.

16. A placing unit for a seed drill, comprising:
at least two furrow-opening disks arranged in V configuration pointing in the direction of advance during use of the seed drill;
at least two means for delivery of particulate or granular products from at least one reservoir constituting part of the seed drill, respective ejection outlets of which means for delivery are situated between the two opener disks in a manner mutually offset along the direction of advance;
a body carrying the disks and said means for delivery;
an elongated seed-firming assembly for firming of the product or products deposited at the bottom of the furrow; and
an interface for linking with the body for the seed-firming assembly, the seed-firming assembly comprises an end for fixation with the interface and an opposite bracing end,
wherein the linking interface comprises at least two fixation sites for a corresponding end of the seed-firming assembly, offset longitudinally relative to one another along the direction of advance, and
wherein the ejection outlet of a second means of the at least two means for delivery of product discharges into or immediately above the linking interface, which forms a sleeve having a passage through the sleeve.

17. The placing unit according to claim 16, wherein the ejection outlet of the second means for delivery of product is a tube and a conduit.

18. A placing unit for a seed drill, comprising:
at least two furrow-opening disks arranged in V configuration pointing in the direction of advance during use of the seed drill;
at least two means for delivery of particulate or granular products from at least one reservoir constituting part of the seed drill, respective ejection outlets of which means for delivery are situated between the two opener disks in a manner mutually offset along the direction of advance;
a body carrying the disks and said means for delivery;
an elongated seed-firming assembly for firming of the product or products deposited at the bottom of the furrow; and
an interface for linking with the body for the seed-firming assembly, the seed-firming assembly comprises an end for fixation with the interface and an opposite bracing end,
wherein the linking interface comprises at least two fixation sites for a corresponding end of the seed-firming assembly, offset longitudinally relative to one another along the direction of advance, wherein the linking interface also has at least one site for fixation of a deflector element, and wherein the site for fixation of a deflector element is a site formed by two coincident facing slots for snap-in mounting of an elongated deflector element in the form of a blade, designed to extend above the seed-firming assembly and provided with projecting lateral wing portions designed to come into engagement in the slots.

* * * * *